US009455464B2

United States Patent
Hiraiwa et al.

(10) Patent No.: US 9,455,464 B2
(45) Date of Patent: Sep. 27, 2016

(54) POWER GENERATION APPARATUS

(71) Applicant: SUMITOMO ELECTRIC INDUSTRIES, LTD., Osaka-shi, Osaka (JP)

(72) Inventors: Chihiro Hiraiwa, Osaka (JP); Masatoshi Majima, Itami (JP); Tetsuya Kuwabara, Osaka (JP); Tomoyuki Awazu, Itami (JP); Naho Mizuhara, Itami (JP); Toshio Ueda, Itami (JP); Hideyuki Doi, Itami (JP); Toshiyuki Kuramoto, Itami (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/092,260

(22) Filed: Apr. 6, 2016

(65) Prior Publication Data
US 2016/0218385 A1     Jul. 28, 2016

Related U.S. Application Data

(62) Division of application No. 13/990,184, filed as application No. PCT/JP2011/077455 on Nov. 29, 2011, now Pat. No. 9,325,024.

(30) Foreign Application Priority Data

Dec. 1, 2010   (JP) ................................. 2010-268473

(51) Int. Cl.
*H01M 8/10*   (2016.01)
*H01M 8/00*   (2016.01)

(52) U.S. Cl.
CPC ........... *H01M 8/1007* (2016.02); *H01M 8/004* (2013.01); *H01M 8/1006* (2013.01)

(58) Field of Classification Search
CPC ........... H01M 8/12; H01M 8/02; H01M 8/06
See application file for complete search history.

(56) References Cited

U.S. PATENT DOCUMENTS

2005/0196657 A1 *   9/2005   Sarkar .................... C04B 38/06
                                                               429/423

FOREIGN PATENT DOCUMENTS

| JP | 07-031966 A | 2/1995 |
|---|---|---|
| JP | 7-116650 A | 5/1995 |

(Continued)

*Primary Examiner* — Stewart Fraser
*Assistant Examiner* — Olatunji Godo
(74) *Attorney, Agent, or Firm* — Drinker Biddle & Reath LLP

(57) ABSTRACT

Provided are a gas decomposition component, a method for producing a gas decomposition component, and a power generation apparatus. A gas decomposition component 10 includes a cylindrical-body MEA 7 including a first electrode 2 disposed on an inner-surface side, a second electrode 5 disposed on an outer-surface side, and a solid electrolyte 1 sandwiched between the first electrode and the second electrode; and a porous metal body 11*s* inserted on the inner-surface side of the cylindrical-body MEA and electrically connected to the first electrode, wherein the gas decomposition component further includes a porous conductive-paste-coated layer 11 *g* formed on an inner circumferential surface of the first electrode, and a metal mesh sheet 11 *a* disposed on an inner circumferential side of the conductive-paste-coated layer, and an electrical connection between the first electrode and the porous metal body is established through the conductive-paste-coated layer and the metal mesh sheet.

10 Claims, 11 Drawing Sheets

(56) References Cited

FOREIGN PATENT DOCUMENTS

| | | |
|---|---|---|
| JP | 11-347535 | 12/1999 |
| JP | 2003-045472 A | 2/2003 |
| JP | 2004-332047 A | 11/2004 |
| JP | 2010-242611 A | 10/2010 |
| WO | WO-2010/035691 A1 | 4/2010 |

\* cited by examiner

11a

11a

CYLINDRICAL MEA

POWER GENERATION APPARATUS

This application is a divisional of U.S. patent application Ser. No. 13/990,184, filed May 29, 2013, the entire contents of which are incorporated herein by reference. U.S. patent application Ser. No. 13/990,184 is a national stage application under §371 of International Application No. PCT/JP2011/077455, filed Nov. 29, 2011, which claims the benefit of Japanese Patent Application No. 2010-268473, filed Dec. 1, 2010.

TECHNICAL FIELD

The present invention relates to a gas decomposition component, a method for producing a gas decomposition component, and a power generation apparatus, in particular, relates to a gas decomposition component that can efficiently decompose a predetermined gas, a method for producing this gas decomposition component, and a power generation apparatus including the gas decomposition component.

BACKGROUND ART

For example, although ammonia is an essential compound in agriculture and industry, it is hazardous to humans and hence there are various known methods for decomposing ammonia in water and the air. A method for removing ammonia through decomposition from water containing ammonia at a high concentration has been proposed: aqueous ammonia being sprayed is brought into contact with airflow to separate ammonia in the air and the ammonia is brought into contact with a hypobromous acid solution or sulfuric acid (Patent Literature 1). Other methods have also been proposed: ammonia is separated in the air by the same process as in the above-described method and the ammonia is incinerated with a catalyst (Patent Literature 2); and ammonia-containing wastewater is decomposed with a catalyst into nitrogen and water (Patent Literature 3). In general, waste gas from semiconductor fabrication equipment contains ammonia, hydrogen, and the like. To completely remove the odor of ammonia, the amount of ammonia needs to be reduced to the ppm order. For this purpose, a method has been commonly used in which waste gas to be released from semiconductor equipment is passed through scrubbers so that water containing chemicals absorbs the hazardous gas. On the other hand, in order to decompose a hazardous gas at a low running cost without supply of energy, chemicals, or the like, a treatment method for waste gas from semiconductor fabrication equipment or the like has also been proposed: ammonia is decomposed with a phosphoric acid fuel cell (Patent Literature 4).

CITATION LIST

Patent Literature

PTL 1: Japanese Unexamined Patent Application Publication No. 7-31966

PTL 2: Japanese Unexamined Patent Application Publication No. 7-116650

PTL 3: Japanese Unexamined Patent Application Publication No. 11-347535

PTL 4: Japanese Unexamined Patent Application Publication No. 2003-45472

SUMMARY OF INVENTION

Technical Problem

Ammonia can be decomposed by the method of using a chemical solution such as a neutralizing agent as described in PTL 1, the incineration method as described in PTL 2, or the method employing a thermal decomposition reaction with a catalyst as described in PTL 3. However, these methods have problems that they require chemicals and external energy (fuel) and also require periodic replacement of the catalyst, resulting in high running costs.

In addition, such an apparatus has a large size and it is difficult to provide a space for additional installation of the apparatus in existing equipment. The apparatus in which a phosphoric acid fuel cell is used to remove ammonia in waste gas from compound semiconductor fabrication also has a problem: since the electrolyte is liquid, the size of air-side and ammonia-side separators cannot be reduced and it is difficult to reduce the size of the apparatus.

An object of the present invention is to provide a gas decomposition component in which an electrochemical reaction using a solid electrolyte is employed to reduce the running cost and to provide high treatment performance, a method for producing a gas decomposition component, and a power generation apparatus.

Solution to Problem

A gas decomposition component according to the present invention includes a cylindrical-body membrane electrode assembly (MEA) including a first electrode disposed on an inner-surface side, a second electrode disposed on an outer-surface side, and a solid electrolyte sandwiched between the first electrode and the second electrode; and a porous metal body inserted on the inner-surface side of the cylindrical-body MEA and electrically connected to the first electrode, wherein the gas decomposition component further includes a porous conductive-paste-coated layer formed on an inner circumferential surface of the first electrode, and a metal mesh sheet disposed on an inner circumferential side of the conductive-paste-coated layer, and an electrical connection between the first electrode and the porous metal body is established through the conductive-paste-coated layer and the metal mesh sheet.

When collectors for the first electrode and the second electrode are constituted by a plurality of members and the contact resistance between the members is high, the electrochemical reaction in the first electrode is inhibited, resulting in a decrease in the gas decomposition efficiency. In particular, when a configuration in which the porous metal body constituting a collector for the first electrode is inserted on the inner-surface side of the cylindrical-body MEA so as to be in direct contact with the first electrode is employed, it is difficult to achieve a large contact area or a high contact pressure between these members and the resistance between these members becomes high, which is problematic.

When a metal mesh sheet is employed, it has the shape of a single sheet and hence can be disposed so as to be in contact with the entire inner circumferential surface of the first electrode. By inserting the porous metal body on the inner side of the metal mesh sheet, the metal dendritic structures in the porous metal body are pressed against each other, and the metal mesh sheet and the porous metal body enter each other's pores to thereby achieve contact with each other. Thus, the contact resistance can be decreased.

However, it is difficult to bring the metal mesh sheet into uniform contact with the entire inner surface of the first electrode. Specifically, there are often variations in the contact pressure between the surface of the first electrode and the metal mesh sheet or the metal mesh sheet often becomes partially separated from the surface of the first electrode. In such a case, current collection that is uniform over the surface of the first electrode cannot be achieved and the occurrence of the electrochemical reaction that is uniform over the entire region of the first electrode cannot be achieved. Accordingly, the efficiency of the electrochemical reaction becomes low.

In the present invention, a porous conductive-paste-coated layer is provided on the inner circumferential surface of the first electrode, and an electrical connection between the first electrode and the porous metal body is established through the porous conductive-paste-coated layer and the metal mesh sheet.

By providing the conductive-paste-coated layer, the surface of the metal mesh sheet can be partially embedded in the conductive-paste-coated layer so that the electrical connection between the metal mesh sheet and the first electrode is established with certainty; as a result, the contact resistance between these members can be considerably decreased. In addition, the entire surface of the metal mesh sheet can be uniformly made to be in contact with the first electrode. Accordingly, the electric resistance between the first electrode and the metal mesh sheet does not locally increase. In addition, by forming the conductive-paste-coated layer by application on the entire surface of the first electrode, even when the metal mesh sheet becomes separated from the conductive-paste-coated layer, current collection on the surface of the first electrode can be ensured. For this reason, even when the metal mesh sheet becomes partially separated from the conductive-paste-coated layer due to the influence of, for example, temperature, the current-collecting effect is not degraded. In addition, since the conductive-paste-coated layer is porous, the gas is not prevented from coming into contact with the first electrode. Accordingly, the electrochemical reaction can be uniformly caused in the entire region of the first electrode to considerably enhance the gas decomposition reaction efficiency. Thus, the gas decomposition treatment performance can be enhanced.

The form of the metal mesh sheet is not particularly limited. For example, according to an embodiment of the present invention, the metal mesh sheet may be formed so as to have a cylindrical shape and may be disposed so as to cover the entire surface of the first electrode.

The appearance configuration of the metal mesh sheet is also not particularly limited. For example, a woven fabric, a nonwoven fabric, or a perforated sheet may be employed. In order to ensure flexibility, uniformity of pore size, or the like, a woven fabric is preferably employed.

A metal material for forming the metal mesh sheet is also not particularly limited. For example, a metal mesh sheet formed of a material such as Ni, Ni—Fe, Ni—Co, Ni—Cr, or Ni—W is preferably employed. A metal mesh sheet having a surface layer such as a silver-plated layer may be employed. When the occurrence of a catalytic reaction is intended, a metal mesh sheet formed of a material such as Ni—W is preferably employed.

The porous conductive-paste-coated layer can be formed from pastes containing various conductive particles. For example, according to another embodiment of the present invention, the porous conductive-paste-coated layer can be formed from a paste containing silver particles. Silver particles have high conductivity and can cause a decrease in the electric resistance of the collector for the first electrode to enhance the gas decomposition treatment performance. Silver particles also have high stability and are not substantially oxidized.

Conductive pastes other than the silver paste may be employed. Examples of usable conductive pastes include conductive pastes containing gold particles, conductive pastes containing platinum particles, and conductive pastes containing particles that have been alloyed so as to have conductivity in a predetermined temperature range.

In addition, conductive pastes of different types may be used. For example, a first coated layer formed from a conductive paste containing nickel particles may be provided on the surface of the first electrode, and a conductive paste containing silver particles may be applied to the first coated layer to form a second coated layer. By providing the first coated layer formed from a conductive paste containing nickel particles, the catalytic reaction on the surface of the first electrode can be promoted; in addition, by providing the second paste-coated layer, the current-collecting effect can be ensured.

To increase the gas decomposition reaction efficiency, the porosity of the conductive-paste-coated layer is preferably set to be at least 10% or more. When the porosity is less than 10%, it becomes difficult to introduce the gas into the conductive-paste-coated layer. To further increase the efficiency, the porosity is preferably set to be 20% to 80%. When the porosity is more than 80%, it is difficult to ensure a sufficiently high strength of the coated layer.

The conductive-paste-coated layer may have a thickness of 5 to 300 p.m. When the thickness is less than 5 uniform contact of the metal mesh sheet with the conductive-paste-coated layer cannot be achieved and it is difficult to ensure sufficiently high conductivity. On the other hand, when the thickness is more than 300 μm, a conductive-paste-coated layer having sufficiently high porosity is difficult to form. In order to ensure conductivity and porosity, the conductive-paste-coated layer is more preferably formed so as to have a thickness of 5 to 100 μm.

A process for forming the conductive-paste-coated layer so as to be porous is also not particularly limited. In order to achieve a predetermined porosity, a conductive paste can be provided so as to contain a predetermined amount of a binder that is removed at a predetermined temperature. In order to suppress shrinkage of the conductive-paste-coated layer during removal of a binder, a sublimable binder is preferably added. For example, a conductive paste containing a naphthalene-based binder is preferably employed. The conductive-paste-coated layer is made porous by being heated to a predetermined temperature to remove the binder. The conductive-paste-coated layer is further subjected to a higher temperature to sinter conductive particles. As a result, a porous conductive-paste-coated layer is formed.

The form of the conductive-paste-coated layer provided is also not particularly limited. According to another embodiment of the present invention, the porous conductive-paste-coated layer may be formed on the entire surface of the first electrode. By forming the conductive-paste-coated layer on the entire surface of the first electrode, even when the metal mesh sheet becomes partially separated from the conductive-paste-coated layer, the current-collecting capability is not degraded.

The porous conductive-paste-coated layer may be formed so as to have a predetermined pattern. For example, according to another embodiment of the present invention, the porous conductive-paste-coated layer may be formed so as to have a band pattern or a grid pattern and be in contact with the metal mesh sheet. When a conductive paste containing expensive metal particles is employed, formation in such a pattern can result in reduction in the cost.

The conductivity between the porous metal body and the metal mesh sheet is also preferably high. For this reason, according to another embodiment of the present invention, a second porous conductive-paste-coated layer may be formed between the outer circumferential surface of the porous metal body and the inner circumferential surface of the metal mesh sheet.

Regarding the second conductive-paste-coated layer, a conductive paste is applied onto the outer circumferential surface of the porous metal body and, after the insertion of the porous metal body into the cylindrical-body MEA, the applied conductive paste can be made porous together with the first conductive-paste-coated layer.

According to another embodiment of the present invention, the first electrode and/or the second electrode may be a sinter containing an ion-conductive ceramic and metal chain particles mainly containing nickel (Ni). The metal chain particles denote an elongated moniliform metal substance in which metal particles are connected together. The metal chain particles are preferably formed of Ni, Fe-containing Ni, or a metal that contains Ni or Fe-containing Ni and a trace amount of Ti. When surfaces of Ni or the like are oxidized, the surfaces of the metal chain particles are oxidized while the contents (portions inside the surface layers) are not oxidized and have metal conductivity.

Accordingly, for example, when ions moving through the solid electrolyte are anions (the ions may be cations), the following effects are provided.

(A1) When the first electrode (anode) is formed so as to contain metal chain particles, in the anode, the chemical reaction between the anions moving through the solid electrolyte and gas molecules in a gaseous fluid introduced into the anode from the outside thereof is promoted (catalysis) with the oxide layers of the metal chain particles and the chemical reaction in the anode is also promoted (promotion effect due to charges) through participation of the anions. The conductivity of electrons generated by the chemical reaction can be ensured in the metal portions of the metal chain particles. As a result, the electrochemical reaction accompanying giving and receiving of charges in the anode can be promoted on the whole. When the first electrode (anode) contains metal chain particles, in the anode, cations such as protons are generated and the cations move through the solid electrolyte to the cathode to thereby similarly provide the above-described promotion effect due to charges.

Note that, prior to use, the oxide layers of the metal chain particles are formed by sintering with certainty; however, during use, the oxide layers are often eliminated by the reduction reaction. Even when the oxide layers are eliminated, the above-described catalysis is not eliminated though it may reduce. In particular, Ni that contains Fe or Ti has high catalysis in spite of the absence of the oxide layers.

(A2) When the second electrode (cathode) is formed so as to contain the metal chain particles, in the cathode, the chemical reaction of gas molecules in a gaseous fluid introduced into the cathode from the outside thereof is promoted (catalysis) with the oxide layers of the metal chain particles; and electron conductivity from the external circuit is enhanced and, through participation of the electrons, the chemical reaction in the cathode is also promoted (promotion effect due to charges). Thus, anions are efficiently generated from the molecules and can be sent to the solid electrolyte.

As with (A1), in (A2), the electrochemical reaction among cations having moved through the solid electrolyte, electrons having flowed through the external circuit, and the second gaseous fluid can be promoted. Accordingly, as in the case where the anode contains the metal chain particles, the electrochemical reaction accompanying giving and receiving of charges in the cathode can be promoted on the whole. Whether the cathode is formed so as to contain the metal chain particles or not depends on the gas to be decomposed.

(A3) When the anode and the cathode are formed so as to contain the metal chain particles, the above-described effects in (A1) and (A2) can be obtained.

The rates of the above-described electrochemical reactions are often limited by the speed at which ions move through the solid electrolyte or the time for which ions move through the solid electrolyte. To increase the movement speed of ions, the gas decomposition component is generally equipped with a heating unit such as a heater and heated at a high temperature such as 600° C. to 1000° C. By the heating to a high temperature, in addition to an increase in the movement speed of ions, chemical reactions accompanying giving and receiving of charges in the electrodes can be promoted.

When the ions moving through the solid electrolyte are anions, as described above, the anions are generated by the chemical reaction in the cathode and supplied. The anions are generated in the cathode through the reaction between molecules of a fluid introduced and electrons. The generated anions move through the solid electrolyte to the anode. The electrons participating in the reaction of the cathode move from the external circuit (including a capacitor, a power supply, and a power consumption device) connecting the anode and the cathode. When the ions moving thorough the solid electrolyte are cations, the cations are generated by the electrochemical reaction in the anode and move through the solid electrolyte to the cathode. Electrons are generated in the anode and flow through the external circuit to the cathode and participate in the electrochemical reaction in the cathode. The electrochemical reactions may be power generation reactions of a fuel cell or may be electrolytic reactions.

According to another embodiment of the present invention, a configuration in which the solid electrolyte has oxygen-ion conductivity or proton conductivity may be employed.

As for oxygen-ion conductivity, a large number of solid electrolytes are known and well-proven.

When an oxygen-ion-conductive solid electrolyte is used, for example, a reaction between electrons and oxygen molecules is caused to generate oxygen ions in the cathode, the oxygen ions move through the solid electrolyte, and the predetermined electrochemical reaction can be caused in the anode. In this case, since the speed at which the oxygen ions move through the solid electrolyte is not higher than that of protons, to achieve a decomposition capacity on the practical level, for example, the following expedients are required: a sufficiently high temperature is provided and/or the thickness of the solid electrolyte is made sufficiently small.

On the other hand, regarding a proton-conductive solid electrolyte, barium zirconate ($BaZrO_3$) and the like are known. When a proton-conductive solid electrolyte is used, for example, ammonia is decomposed in the anode to generate protons, nitrogen molecules, and electrons; the protons move through the solid electrolyte to the cathode and react with oxygen in the cathode to generate water ($H_2O$). Protons are smaller than oxygen ions and hence move through the solid electrolyte at a higher speed than oxygen ions. Accordingly, at a lower heating temperature, a decomposition capacity on the practical level can be achieved.

For example, when ammonia is decomposed with a cylindrical-body MEA in which an anode is disposed on the inner side thereof and an oxygen-ion-conductive solid electrolyte is used, a reaction of generating water is caused inside (in the anode) of the cylindrical body. The water takes the form of water droplets at low-temperature portions near the outlet and may cause pressure loss. In contrast, when a proton-conductive solid electrolyte is used, protons, oxygen molecules, and electrons are generated in the cathode (outside). Since the outside is substantially open, even when adhesion of water droplets occurs, pressure loss is less likely to be caused.

According to another embodiment of the present invention, a first gaseous fluid may be introduced into the first electrode, a second gaseous fluid may be introduced into the second electrode, and electric power may be output from the first electrode and the second electrode. In this case, the gas to be decomposed can be used as fuel and the gas decomposition component can constitute a fuel cell to generate electric power.

According to another embodiment of the present invention, a heater may be further provided and the electric power may be supplied to the heater. In this case, gas decomposition can be performed with high energy efficiency.

The gas to be decomposed is also not particularly limited. For example, any one of the above-described gas decomposition components is disposed; and a gaseous fluid containing ammonia may be introduced into the first electrode and a gaseous fluid containing oxygen molecules may be introduced into the second electrode. In this case, oxygen ions generated in the second electrode (cathode) move to the first electrode (anode); the reaction between ammonia and oxygen ions is caused in the first electrode under the catalysis due to metal chain particles and the promotion effect due to ions; and electrons generated by the reaction can be rapidly moved.

Another embodiment of the present invention can provide a power generation apparatus including a gas decomposition component of the above-described embodiments and a power-supply part that supplies the electric power to another electric apparatus. In this case, a gas decomposition component regarded as a power generation apparatus can be used to generate electric power with, for example, a combination of gases from which only emission gas placing no load on the global environment is generated.

Another embodiment of the present invention relates to a method for producing a gas decomposition component, the method including a step of preparing a cylindrical-body membrane electrode assembly (MEA) including a first electrode disposed on an inner-surface side, a second electrode disposed on an outer-surface side, and a solid electrolyte sandwiched between the first electrode and the second electrode; a step of forming a conductive-paste-coated layer on an inner circumferential surface of the first electrode of the cylindrical-body MEA by applying a conductive paste containing a binder to a predetermined thickness; a step of disposing the metal mesh sheet on an inner circumferential side of the conductive-paste-coated layer; a step of inserting a central conductive rod around which a porous metal sheet is wound, into the cylindrical-body MEA in which the metal mesh sheet has been disposed; and a step of making the conductive-paste-coated layer porous by heating the cylindrical-body MEA obtained in the insertion step to remove the binder in the conductive paste.

According to the above-described production method, the first-electrode collector having a low electric resistance can be formed and a gas decomposition component having high treatment performance can be produced.

Another embodiment of the present invention relates to the method for producing a gas decomposition component, the method further including a step of forming a second conductive-paste-coated layer by applying the conductive paste onto an outer circumferential surface of the porous metal body. In this case, the electric resistance between the porous metal body and the metal mesh sheet can be decreased and the treatment performance can be further enhanced.

Another embodiment of the present invention relates to the method for producing a gas decomposition component wherein, in the step of forming the conductive-paste-coated layer, the conductive-paste-coated layer is formed so as to contain a sublimable binder, and the step of making the conductive-paste-coated layer porous is performed by subliming the sublimable binder.

By employing a conductive paste containing a sublimable binder, shrinkage of the conductive-paste-coated layer at the time when the conductive-paste-coated layer becomes porous can be suppressed. Thus, the metal mesh sheet can be connected to the surface of the first electrode with certainty.

Another embodiment of the present invention relates to the method for producing a gas decomposition component wherein the conductive paste is a silver paste that becomes porous through removal of the binder.

A gas decomposition component according to the present invention will be used not only in gas detoxification but also as, for example, electrodes serving as bases of apparatuses, in the fields of fuel cells and original electrochemical reaction apparatuses employing gas decomposition, to thereby contribute to, for example, enhancement of the efficiency of electrochemical reactions, size reduction of apparatuses, and low running costs.

Advantageous Effects of Invention

A gas decomposition component and the like according to the present invention have high treatment performance and can be operated at low running cost. In particular, while the electric resistance is decreased, the gas decomposition reaction in the electrode can be promoted and hence a gas decomposition component and the like that have a small size and high cost efficiency can be obtained.

DESCRIPTION OF EMBODIMENTS

Hereinafter, embodiments of the present invention will be specifically described with reference to the drawings.

First Embodiment

Figure 1A:
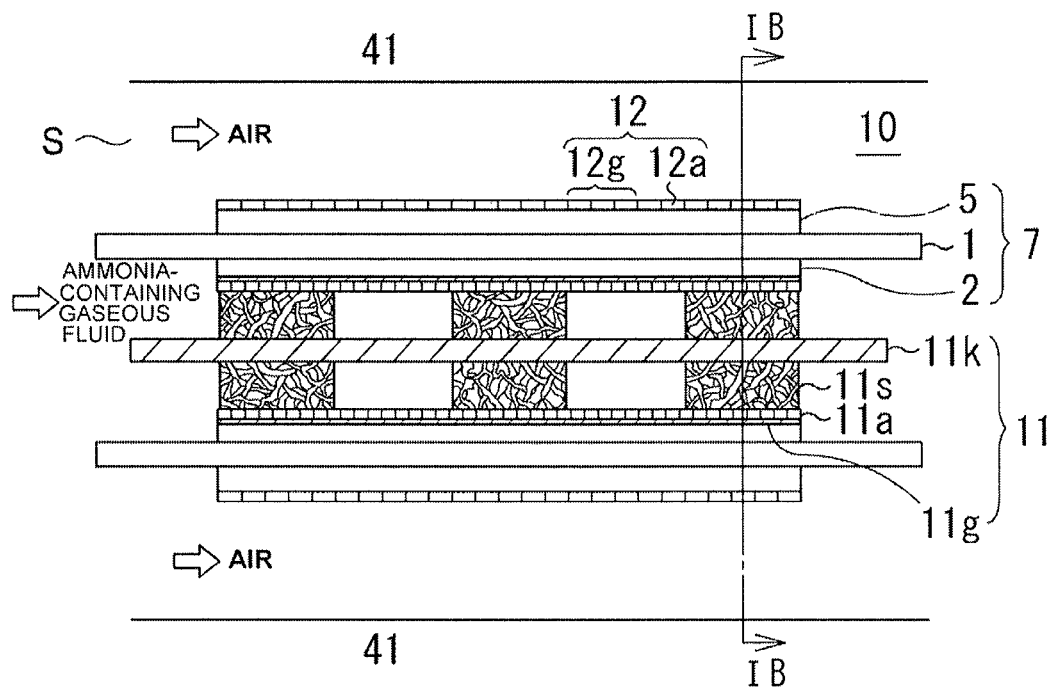
FIG. 1A is a longitudinal sectional view of a gas decomposition component according to a first embodiment of the present invention.
Figure 1B:
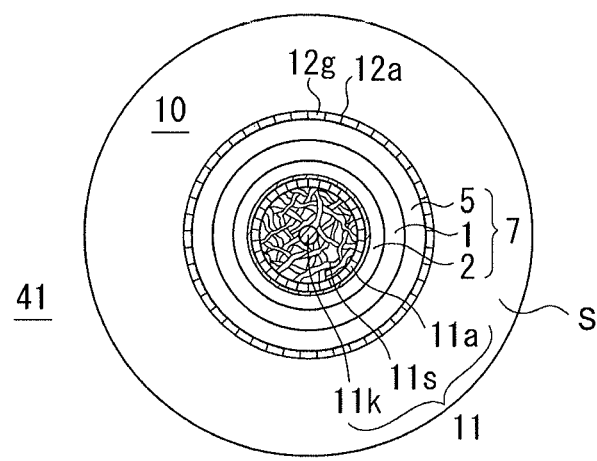
FIG. 1B is a sectional view taken along line IB-IB in FIG. 1A.

FIG. 1A is a longitudinal sectional view of a gas decomposition component 10 according to a first embodiment of the present invention. FIG. 1B is a sectional view taken along line IB-IB in FIG. 1 A. In the present embodiment, in particular, an embodiment directed to a gas decomposition component for decomposing ammonia gas is described.

In the gas decomposition component 10, an anode (first electrode) 2 is disposed so as to cover the inner surface of a cylindrical solid electrolyte 1 and a cathode (second electrode) 5 is disposed so as to cover the outer surface of the cylindrical solid electrolyte 1; thus, a cylindrical-body MEA 7 (1,2,5) is formed. The anode 2 may be referred to as a fuel electrode. The cathode 5 may be referred to as an air electrode. In general, the cylindrical body constituting the cylindrical-body MEA 7 (1,2,5) may have a winding shape such as a spiral shape or a serpentine shape; in FIGS. 1A and 1B, the cylindrical body is formed so as to have a right-cylindrical shape. Although the cylindrical-body MEA has an inner diameter of, for example, about 20 mm, the dimensions and the like thereof may be defined in accordance with apparatuses to which the cylindrical-body MEA is applied. In the gas decomposition component 10 according to the present embodiment, an anode collector 11 is disposed so as to fill the inner cylinder of the cylindrical-body MEA 7 having a cylindrical shape. A cathode collector 12 is disposed so as to wind around the outer surface of the cathode 5. The configurations of the collectors are as follows.

<Anode Collector 11>: Silver-Paste-Coated Layer 11g/Ni Mesh Sheet 11a/Porous Metal Body 11s/Central Conductive Rod 11k A Ni mesh sheet 11a is in contact with the anode 2 with a silver-paste-coated layer 11g therebetween, the anode 2 being disposed on the inner-surface side of the cylindrical-body MEA 7, to conduct electricity from a porous metal body 11s to a central conductive rod 11k. The porous metal body 11s is preferably a metal-plated body that can be formed so as to have a high porosity such as Celmet (registered trademark: Sumitomo Electric Industries, Ltd.) for the purpose of decreasing the pressure loss of an ammonia-containing gaseous fluid described below. In order to decrease the electric resistance between the anode 2 and the anode collector 11, the silver-paste-coated layer 11g and the Ni mesh sheet 11a are disposed. On the inner-surface side of the cylindrical-body MEA 7, it is important that, while the overall electric resistance of the collector 11 formed of a plurality of members (11g, 11a, 11 s, 11k) is made low, the pressure loss in the introduction of a gaseous fluid on the anode side is made low.

<Cathode Collector 12>: Silver-Paste-Coated Wiring 12g+Ni Mesh Sheet 12a

In the present embodiment, a Ni mesh sheet 12a is in contact with the outer surface of the cylindrical-body MEA 7 to conduct electricity to the external wiring. Silver-paste-coated wiring 12g contains silver serving as a catalyst for promoting decomposition of oxygen gas into oxygen ions in the cathode 5 and also contributes to a decrease in the electric resistance of the cathode collector 12. The silver-paste-coated wiring 12g having predetermined properties allows passing of oxygen molecules therethrough and contact of silver particles with the cathode 5. Thus, catalysis similar to that would be provided by silver particles contained in the cathode 5 is exhibited. In addition, this is less expensive than the case where the cathode 5 is formed so as to contain silver particles.

Figure 2:
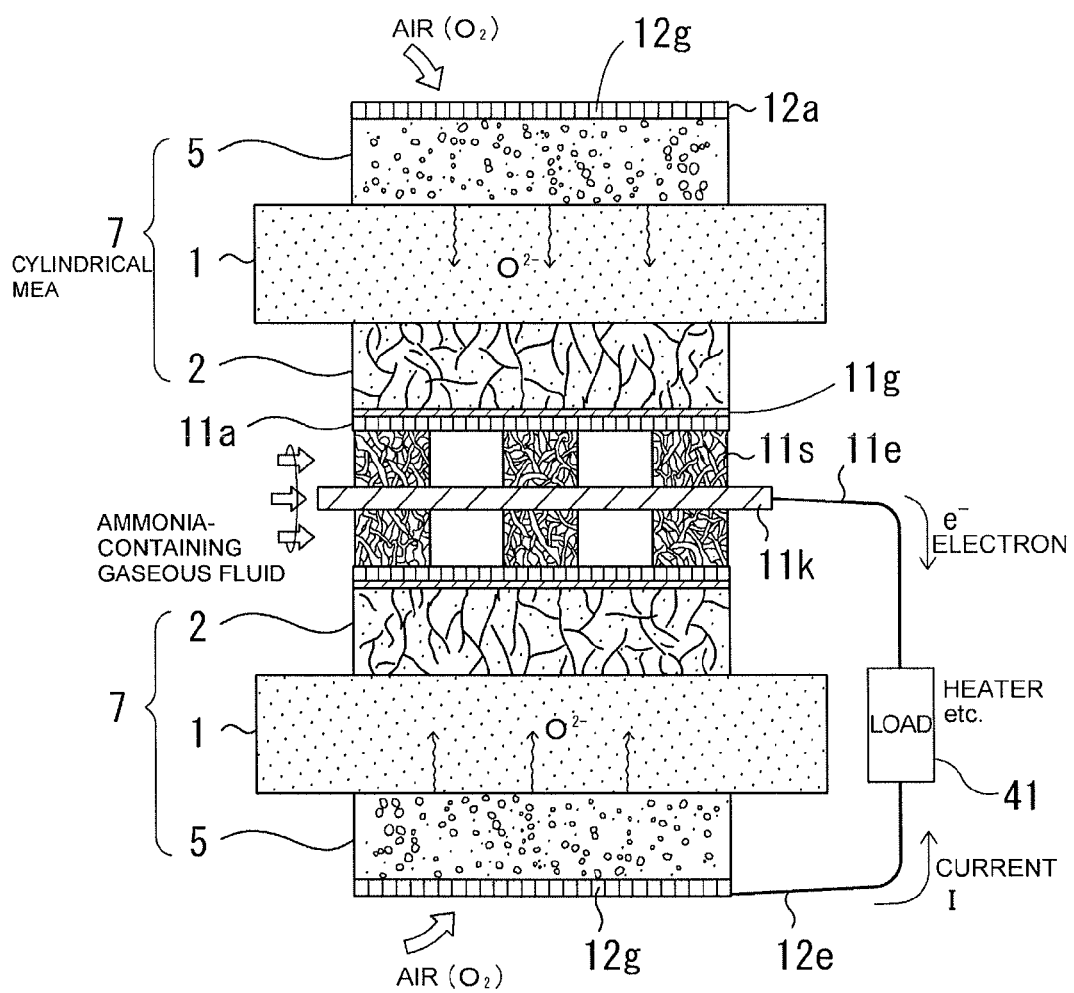
FIG. 2 illustrates the electric wiring system of the gas decomposition component in FIGS. 1A and 1B.

FIG. 2 illustrates the electric wiring system of the gas decomposition component 10 in FIGS. 1A and 1B when the solid electrolyte 1 is oxygen-ion conductive. An ammonia-containing gaseous fluid is introduced into the inner cylinder of the highly-airtight cylindrical-body MEA 7, that is, the space where the anode collector 11 is disposed. When the cylindrical-body MEA 7 is used, in order to pass the gaseous fluid on the inner-surface side of the cylindrical-body MEA 7, the porous metal body 11s is used. In view of decreasing the pressure loss, as described above, the porous metal body 11s may be a porous metal-plated body, such as Celmet. While the ammonia-containing gaseous fluid passes through pores in the porous metal body 11s, the Ni mesh sheet 11a, and the porous silver-paste-coated layer 11g, it also comes into contact with the anode 2, resulting in an ammonia decomposition reaction described below.

Oxygen ions $O^{2-}$ are generated by an oxygen gas decomposition reaction in the cathode 5 and pass through the solid electrolyte 1 to reach the anode 2. That is, this is an electrochemical reaction in the case where oxygen ions, which are anions, move through the solid electrolyte 1.

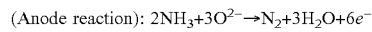

(Anode reaction): $2NH_3+3O^{2-} \rightarrow N_2+3H_2O+6e^-$

Specifically, a portion of ammonia reacts: $2NH_3 \rightarrow N_2+3H_2$. These $3H_2$ react with the oxygen ions $3O^{2-}$ to generate $3H_2O$.

The air, in particular, oxygen gas is passed through a space S and introduced into the cathode 5. Oxygen ions dissociated from oxygen molecules in the cathode 5 are sent to the solid electrolyte 1 toward the anode 2. The cathode reaction is as follows.

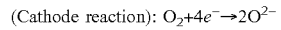

(Cathode reaction): $O_2+4e^- \rightarrow 2O^{2-}$

As a result of the electrochemical reaction, electric power is generated; a potential difference is generated between the anode 2 and the cathode 5; current I flows from the cathode collector 12 to the anode collector 11. When a load, such as a heater 41 for heating the gas decomposition component 10, is connected between the cathode collector 12 and the anode collector 11, electric power for the heater 41 can be supplied. This supply of electric power to the heater 41 may be a partial supply. In most cases, the amount of supply from the self power generation is equal to or lower than half of the overall electric power required for the heater.

In the gas decomposition component 10, it is important that, in the anode 2 disposed on the inner-surface side of the cylindrical-body MEA 7, while the electric resistance of the anode collector 11 is made low, the pressure loss in the gaseous fluid passing through the anode collector 11 is made low. On the cathode side, although the air does not pass through the cylinder, it is important that the density of contact points between the air and the cathode is made high and the resistance of the cathode collector 12 is also made low.

The above-described electrochemical reaction is one in which oxygen ions, which are anions, move through the solid electrolyte 1. In another desirable embodiment according to the present invention, for example, the solid electrolyte 1 is composed of barium zirconate ($BaZrO_3$) and a reaction is caused in which protons are generated in the anode 2 and moved through the solid electrolyte 1 to the cathode 5.

When a proton-conductive solid electrolyte 1 is used, for example, in the case of decomposing ammonia, ammonia is decomposed in the anode 2 to generate protons, nitrogen molecules, and electrons; the protons are moved through the solid electrolyte 1 to the cathode 5; and, in the cathode 5, the protons react with oxygen to generate water ($H_2O$). Since protons are smaller than oxygen ions, they move through the solid electrolyte at a higher speed than oxygen ions. Accordingly, while the heating temperature can be decreased, the decomposition capacity on the practical level can be achieved.

In addition, the solid electrolyte 1 can be formed so as to have a thickness providing a sufficiently high strength.

For example, when ammonia is decomposed with a cylindrical-body MEA, an anode is disposed inside the cylindrical-body MEA, and an oxygen-ion-conductive solid electrolyte is used, a reaction generating water occurs inside the cylindrical-body MEA (in the anode). The water takes the form of water droplets at low-temperature portions near the outlet of the cylindrical-body MEA and may cause pressure loss. In contrast, when a proton-conductive solid electrolyte is used, protons, oxygen molecules, and electrons react in the cathode (outside) to generate water. Since the outside is substantially open, even when water droplets adhere to low-temperature portions near the outlet, pressure loss is less likely to be caused.

<Features of Gas Decomposition Component According to the Present Embodiment>:

1. Ni Mesh Sheet 11a of Anode Collector:

The Ni mesh sheet 11a in the anode collector 11 in FIGS. 1A and 1B is used to decrease the electric resistance of the anode collector 11 to thereby contribute to a decrease in the pressure of the gas flow. The anode collector 11 has an electric conduction path of anode 2/porous silver-paste-coated layer 11g/Ni mesh sheet 11a/porous metal body (Celmet) 11s/central conductive rod 11k. When the Ni mesh sheet is not used, the porous metal body his is in direct contact with the anode 2. In this case, even when the metal porous metal body 11s is constituted by a metal-plated body such as Celmet, the contact resistance becomes high. The porous metal body 11s has the shape of a sheet having a predetermined thickness; microscopically, dendritic metal forms a network structure. When the porous metal body 11s is inserted as a first-electrode collector on the inner-surface side of the cylindrical-body MEA 7, the above-described sheet-shaped porous metal body 11s is spirally wound and inserted such that the axial center of the spiral extends along the axial center of the cylindrical-body MEA 7. This porous metal body 11s has the spiral shape and hence tends to become partially separated from the surface of the anode 2. In particular, when the porous metal body 11s repeatedly expands and contracts due to heating and cooling, permanent deformation may be caused to degrade elasticity for pressing the anode 2. As a result, the contact area or the contact pressure between the porous metal body 11s and the anode 2 may decrease. Accordingly, when electrical connection is established by direct contact between the porous metal body 11s and the first electrode, the contact resistance becomes high, resulting in an increase in the electric resistance of the first-electrode collector. An increase in the electric resistance of the collector 11 results in degradation of the electrochemical-reaction performance. When the porous metal body 11s is arranged continuously over the entire length of the anode for the purpose of increasing the contact area, the pressure loss of the introduced gaseous fluid is increased.

In contrast, by using a metal mesh sheet, that is, the Ni mesh sheet 11a, the contact resistance can be decreased in the following manner. Specifically, since the Ni mesh sheet 11a has the shape of a single sheet, the Ni mesh sheet 11a can be disposed so as to be in contact with the entire circumference of the cylindrical inner surface of the first electrode. As a result of, for example, application of an external force (compressive) for filling the cylindrical body and adjustment of increasing the amount of materials for the filling, the Ni mesh sheet 11a and the porous metal body s conform to each other and protrude to the anode 2, resulting in an increase in the contact area with the anode 2. At the contact interface between the Ni mesh sheet 11a and the porous metal body 11s, the metal dendritic structures are pressed against each other and enter each other's pores to thereby achieve contact with each other. Accordingly, a low contact resistance is maintained.

As described above, even when a metal-plated body Celmet (registered trademark) is used as the porous metal body 11s, the absence of a Ni mesh sheet results in a relatively high contact resistance: the electric resistance between the cathode collector 12 and the anode collector 11 of the gas decomposition component 10 is, for example, about 4 to about 7Ω. By inserting the Ni mesh sheet 11a into this structure, the electric resistance can be decreased to about 1Ω or less, that is, decreased by a factor of about 4 or more.

By disposing the Ni mesh sheet 11a, it will suffice that the porous metal body 11s is discontinuously disposed inside the cylindrical body MEA 7. Thus, in the configuration illustrated in FIG. 1A, a sufficiently low electric resistance can be achieved. Accordingly, the conventional necessity of continuously arranging the porous metal body 11s over the entire length of the cylindrical body MEA 7 is eliminated. As a result of discontinuously arranging the porous metal body 11s at intervals, pressure loss in the flow of the ammonia-containing gaseous fluid can be considerably decreased. As a result, for example, a sufficiently large amount of an ammonia-containing gaseous fluid discharged from a waste-gas unit of semiconductor fabrication equipment can be extracted without application of a high negative pressure and the electric-power cost required for extracting the gaseous fluid can be reduced. In addition, the requirements for parts of the piping system and the gas decomposition component in terms of negative pressure can be relaxed. Thus, the cost efficiency can be enhanced and the risk of accidents due to high negative pressure or the like can also be reduced.

Figure 3A:
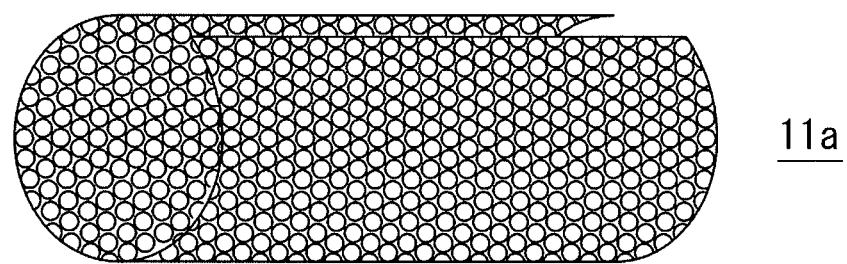
FIG. 3A illustrates a Ni mesh sheet in a gas decomposition component according to the first embodiment, the sheet having a structure formed by perforating a Ni sheet.
Figure 3B:
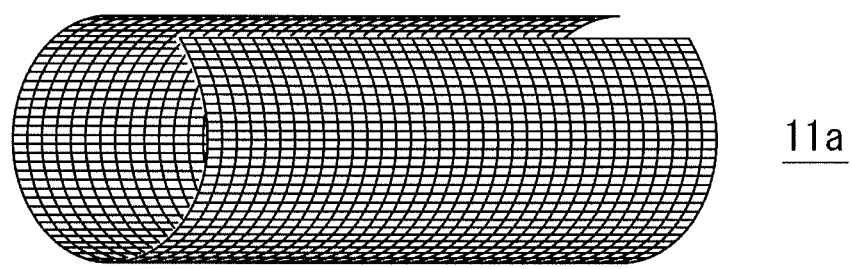
FIG. 3B illustrates a Ni mesh sheet in a gas decomposition component according to the first embodiment, the sheet having a structure formed by knitting Ni wires.

The form of the Ni mesh sheet is not particularly limited. For example, the Ni mesh sheet may be formed so as to have a cylindrical shape and may be disposed so as to cover the entire surface of the first electrode. FIGS. 3A and 3B illustrate examples of the Ni mesh sheets 11a. As for FIG. 3A, a single-phase Ni sheet is perforated to form the mesh structure. As for FIG. 3B, Ni wires are knitted to form the mesh structure. Both of these sheets may be used as the Ni mesh sheets 11a. The Ni mesh sheets 11a need not have the shape of a whole cylinder and may have the shape of a partial cylinder whose top portion is open.

A metal material for forming the metal mesh sheet is also not particularly limited. For example, the Ni mesh sheet 11a formed of a material such as Ni, Ni—Fe, Ni—Co, Ni—Cr, or Ni—W is preferably employed. A metal mesh sheet having a surface layer such as a silver-plated layer may be employed. When the occurrence of a catalytic reaction is intended, a metal mesh sheet formed of a material such as Ni—W is preferably employed.

2. Silver-Paste-Coated Layer 11g:

As described above, by disposing the Ni mesh sheet 11a on the inner surface of the anode 2, electric resistance, in particular, the electric resistance between the porous metal body 11s and the anode 2 can be decreased to a certain degree. However, it is difficult to dispose the Ni mesh sheet 11a so as to be in uniform contact with the inner circumferential surface of the anode 2. Specifically, the electric resistance between the sheet and the anode 2 varies depending on portions due to variations in contact pressure or separation of the sheet. Thus, there may be cases where the gas decomposition reaction cannot efficiently proceed over the entire surface of the anode 2. In the present embodiment, since the Ni mesh sheet 11a is disposed on the anode 2 with the silver-paste-coated layer 11g therebetween, uniform contact can be achieved over the entire contact region between the Ni mesh sheet 11a and the anode 2. The gas decomposition reaction can be made to proceed uniformly over the entire surface of the anode 2. Accordingly, the gas decomposition efficiency can be considerably enhanced.

The anode 2 is formed of a ceramic and hence the amount of expansion and contraction thereof due to temperature change is relatively small. In contrast, the amount of expansion and contraction of the Ni mesh sheet 11a is relatively large. Accordingly, during long-term usage, the Ni mesh sheet 11a disadvantageously becomes separated from the surface of the anode 2. In the present embodiment, since the silver-paste-coated layer 11g is provided, this disadvantage can be avoided.

Figure 5A:
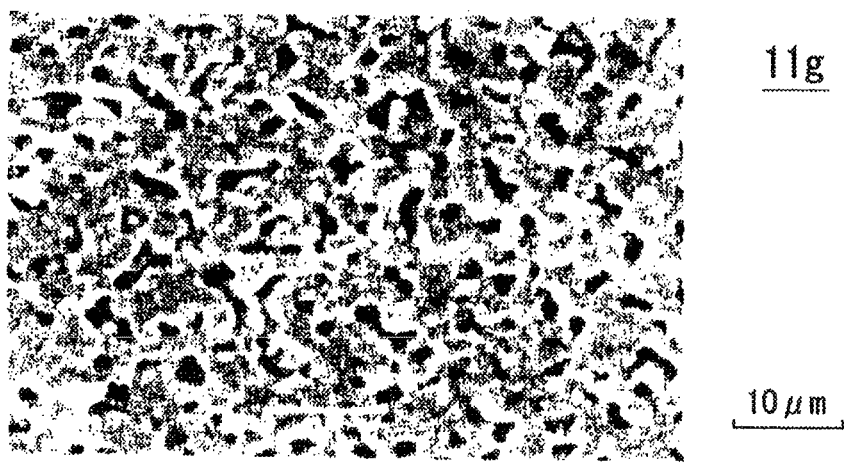
FIG. 5A is an image data, a scanning electron microscopic image illustrating the surface state of a silver-paste-coated layer.
Figure 5B:
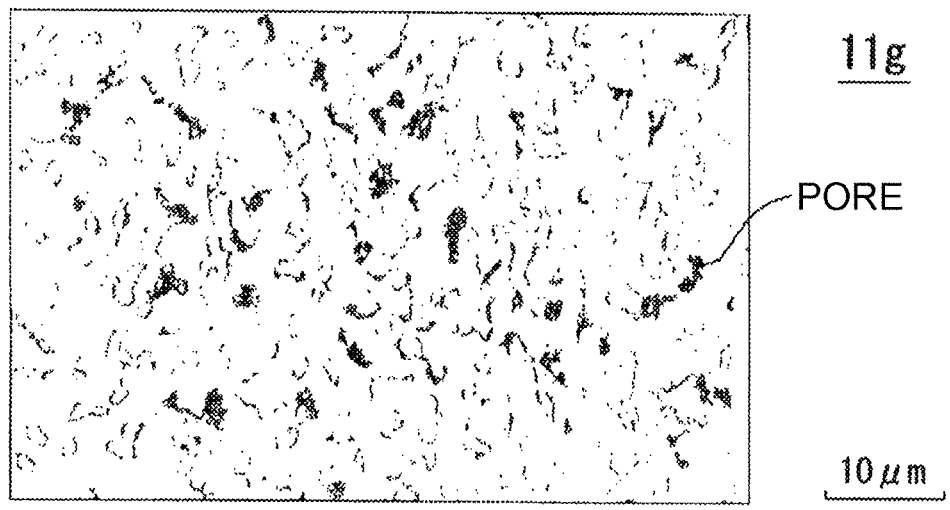
FIG. 5B is an explanatory view for FIG. 5A.

In such a silver-paste-coated layer, it is important that the silver paste is dried or sintered so as to provide a porous structure having a high porosity. FIGS. 5A and 5B are scanning electron microscopy (SEM) images illustrating the surface of the silver-paste-coated layer 11g: FIG. 5A is an image data and FIG. 5B is an explanatory view of the image data. Silver pastes that provide a porous structure as illustrated in FIGS. 5A and 5B by being applied and dried (sintered) are commercially available. For example, DD-1240 manufactured by Kyoto Elex Co., Ltd. may be used. As illustrated in FIG. 5B, the pores are in communication with one another. By forming the silver-paste-coated layer 11g so as to be porous, a large number of ammonia molecules $NH_3$ enter pores of the porous structure to come into contact with the catalyst in the anode, increasing the probability of the occurrence of the anode reaction.

To increase the gas decomposition reaction efficiency, the porosity of the silver-paste-coated layer 11g is preferably set to be at least 10% or more. When the porosity is less than 10%, it becomes difficult to introduce the gas into the conductive-paste-coated layer 11g. In order to further increase the efficiency, the porosity is preferably set to be 20% to 80%. In order to ensure sufficiently high conductivity and sufficiently high strength of the coated layer, the porosity is preferably set to be 80% or less.

Figure 6:
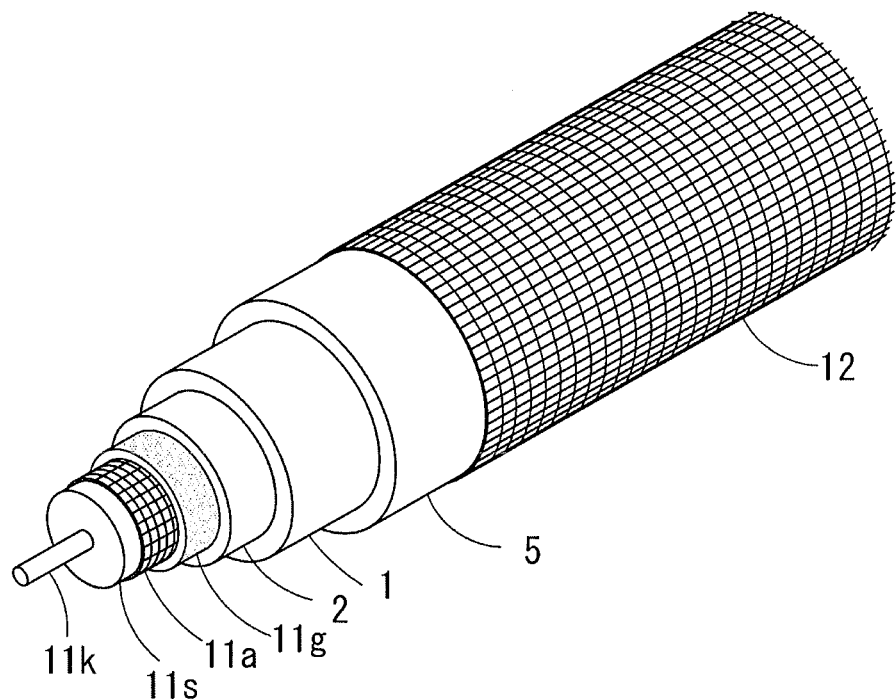
FIG. 6 is a cutaway view illustrating the internal structure of a gas decomposition component according to the first embodiment.
Figure 7:
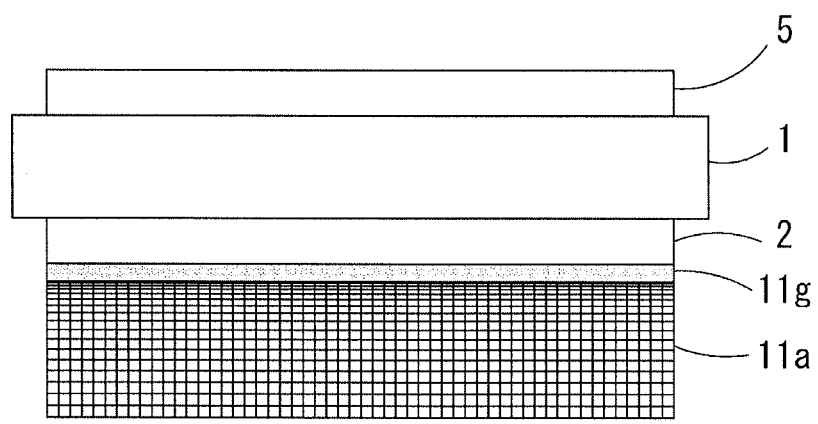
FIG. 7 is a longitudinal sectional view illustrating the state of a metal mesh sheet disposed.
Figure 8:
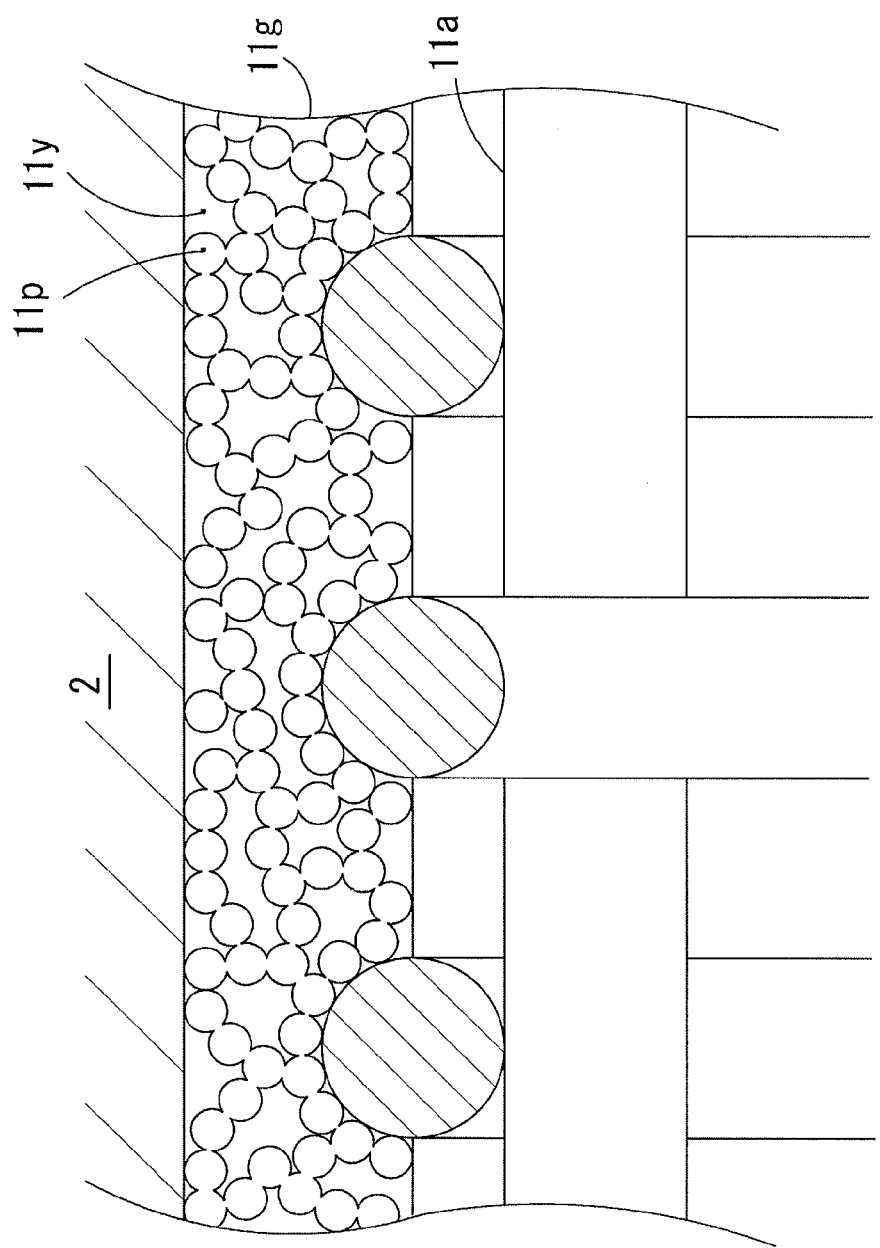
FIG. 8 is an enlarged sectional view of a main portion in FIG. 7.

The silver-paste-coated layer 11g, which has high conductivity, in combination with the Ni mesh sheet 11a causes a decrease in the electric resistance of the anode collector 11. Specifically, as illustrated in FIGS. 6 to 8, the Ni mesh sheet 11a is disposed so as to be partially embedded in the silver-paste-coated layer 11g. As a result, the entire region of the Ni mesh sheet 11a can be connected to the anode 2 with the silver-paste-coated layer 11g therebetween.

The silver-paste-coated layer 11g may have a thickness of 5 to 300 μm. When the thickness is less than 5 μm, uniform contact with the silver-paste-coated layer 11g is not achieved over the entire region of the Ni mesh sheet 11a and it is difficult to ensure sufficiently high conductivity. On the other hand, when the thickness is more than 300 μm, a paste-coated layer having sufficiently high porosity is difficult to form. In order to ensure conductivity and porosity, the silver-paste-coated layer 11g is more preferably formed so as to have a thickness of 5 to 100 μm.

A process for forming the silver-paste-coated layer 11g is not particularly limited. The silver-paste-coated layer 11g can be formed by, for example, a dipping process in which the cylindrical-body MEA 7 is dipped in a dipping layer filled with a silver paste or a process in which a coating nozzle is inserted to spray a silver paste on the interior of the cylindrical-body MEA 7.

A process for forming the silver-paste-coated layer 11g so as to be porous is also not particularly limited. In order to achieve the above-described predetermined porosity, a silver paste containing a predetermined amount of a binder that is removed at a predetermined temperature may be employed. In order to suppress shrinkage of the conductive-paste-coated layer during removal of a binder, a sublimable binder is preferably added. For example, a silver paste containing a naphthalene-based binder is preferably employed. The silver-paste-coated layer 11g is heated to a predetermined temperature so that the binder is removed to provide a porous structure; the silver-paste-coated layer 11g is further heated to a higher temperature so that the silver particles are sintered; and, as a result, the silver-paste-coated layer 11g having a porous structure is formed.

Although a region in which the silver-paste-coated layer 11g is formed is also not particularly limited, the silver-paste-coated layer 11g is preferably formed over the entire surface of the anode 2. By forming the silver-paste-coated layer 11g over the entire surface of the anode 2, even when the Ni mesh sheet becomes partially separated from the silver-paste-coated layer, the current-collecting capability for the anode 2 is not degraded.

Where allowable, the silver-paste-coated layer 11g may be formed so as to have a predetermined pattern. For example, the silver-paste-coated layer 11g may be formed so as to have a band pattern or a grid pattern and be in contact with the Ni mesh sheet 11a. The formation in such a pattern results in a decrease in the amount of silver paste used and a decrease in the production cost.

3. Central Conductive Rod 11k:

In the present embodiment, the cylindrical-body MEA 7 is cylindrical and the anode collector 11 includes the central conductive rod 11k. The central conductive rod 11k is preferably formed of a metal such that at least the surface layer does not contain Cr. For example, a Ni conductive rod 11k is preferably used. This is because, when stainless steel containing Cr is employed, during the use, Cr poisoning inhibits the function of ceramic in the anode 2, such as GDC. Although the diameter of the central conductive rod 11k is not particularly limited, it is preferably about 1/9 to about 1/3 of the inner diameter of the cylindrical solid electrolyte 1. For example, when the inner diameter is 18 mm, the diameter is preferably about 2 to about 6 mm. When the diameter is excessively large, the maximum gas flow rate becomes low. When the diameter is excessively small, the electric resistance becomes high, leading to a decrease in the voltage at the time of electric power generation. The porous metal body 11s having the shape of a sheet (Celmet sheet) is spirally tightly wound around the central conductive rod 11k to keep the spiral state of the porous metal body 11s. Accordingly, the electric resistance at the interface between the porous metal body 11s and the central conductive rod 11k can be made low.

Figure 4:
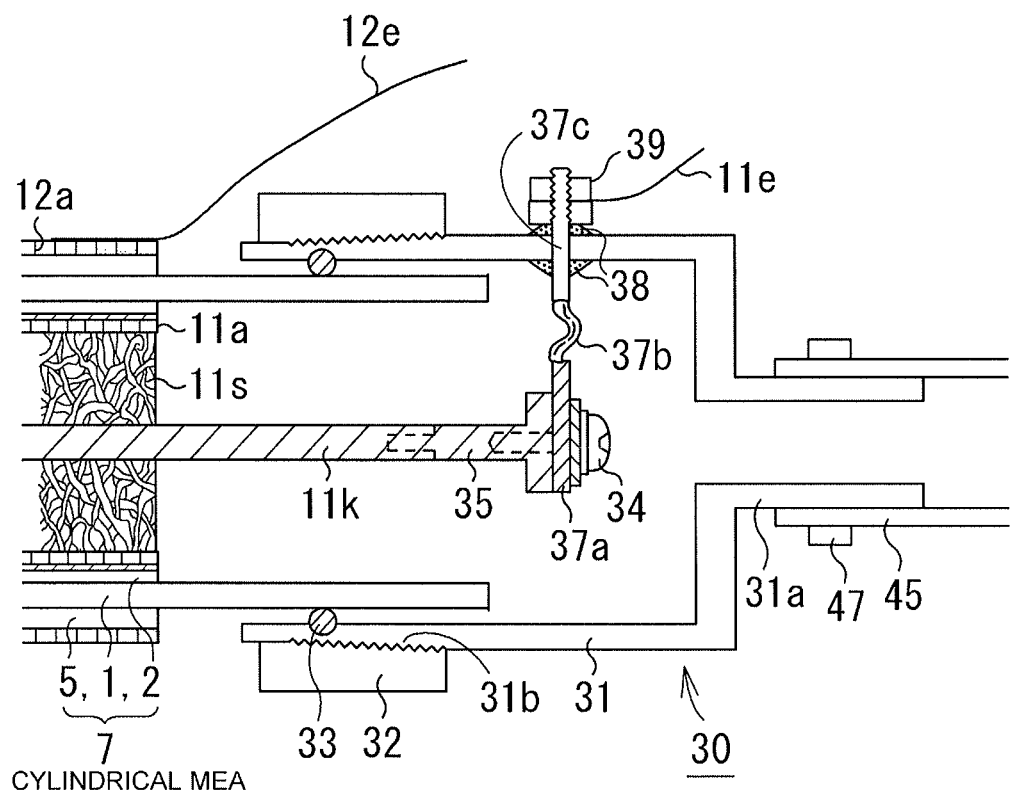
FIG. 4 illustrates a state in which an external wire and a gaseous-fluid transfer passage are connected to a cylindrical-body MEA.

FIG. 4 illustrates a connection state between the central conductive rod 11k and an external wire 11e and a connection state between the cylindrical-body MEA 7 and a gaseous-fluid transfer passage 45. A pipe joint 30 formed of a fluorocarbon resin is engaged with the end of the cylindrical-body MEA 7. The engagement is performed such that the following state is maintained: an O-ring 33 contained on the inner-surface side of an engagement portion 31b extending from a body portion 31 of the pipe joint 30 to the solid electrolyte 1 butts against the outer surface of the solid electrolyte 1 composed of a ceramic, which is a sinter. Accordingly, the engagement portion 31b of the pipe joint 30 is formed so as to have an outer diameter that changes in a tapered manner. The tapered portion is threaded and, to this thread, a circular nut 32 is screwed. By screwing the circular nut in the direction in which the outer diameter increases, the engagement portion 31b is tightened in its outer surface. Thus, the airtightness provided with the O-ring 33 can be adjusted.

In the body portion 31 of the pipe joint 30, a conductive penetration part 37c that penetrates the body portion 31 in an airtight manner is provided. To ensure the airtightness, for example, a sealing resin 38 is applied. The conductive penetration part 37c is preferably a cylindrical rod threaded for screwing a nut 39 for the purpose of ensuring electrical connection with the external wire 11e. To the intra-pipe end of the conductive penetration part 37c, a conductive lead 37b is connected. Another end of the conductive lead 37b is connected to a connection plate 37a.

Electrical connection between the connection plate 37a and a tip portion 35 of the central conductive rod 11k is established by using a connection tool such as a screwdriver and tightening a screw 34 with the screwdriver inserted into a protrusion hole portion 31a of the pipe joint 30. By tightening the screw 34 with the screwdriver, the electric resistance (contact resistance) in the electrical connection between the tip portion 35 and the connection plate 37a can be substantially eliminated.

By winding an external wire 12e around the outer circumference of an end portion of the Ni mesh sheet 12a of the cathode collector 12, connection to the outside can be established. Since the cathode 5 is positioned on the outer-surface side of the cylindrical-body MEA 7, the establishment of the connection is less difficult than that from the anode collector 11 to the outside.

The gaseous-fluid transfer passage 45 is preferably an elastically deformable pipe composed of, for example, a resin. An end of this pipe is engaged around the outer circumference of the protrusion hole portion 31a and fastened with a fastener 47. As a result, a connection that is highly airtight can be obtained.

In FIG. 4, both of the connection between the anode collector 11 and the external wire 11e and the connection between the pipe joint 30 and the gaseous-fluid transfer passage 45 are achieved by very simple and small structures. In addition, these two connections are disposed at positions that are separated from the main stream of heat from the heater, by using the central conductive rod 11k and the tip portion 35 attached thereto. Accordingly, use of a fluorocarbon resin, which is an ordinary heat- or corrosion-resistant resin, can ensure durability for repeated use for a long period of time. The central conductive rod 11k can be electrically connected to the porous metal body 11s with a low contact resistance.

Hereinafter, effects of components will be described.

<Anode 2>

—Configuration and Effect—

Figure 9:
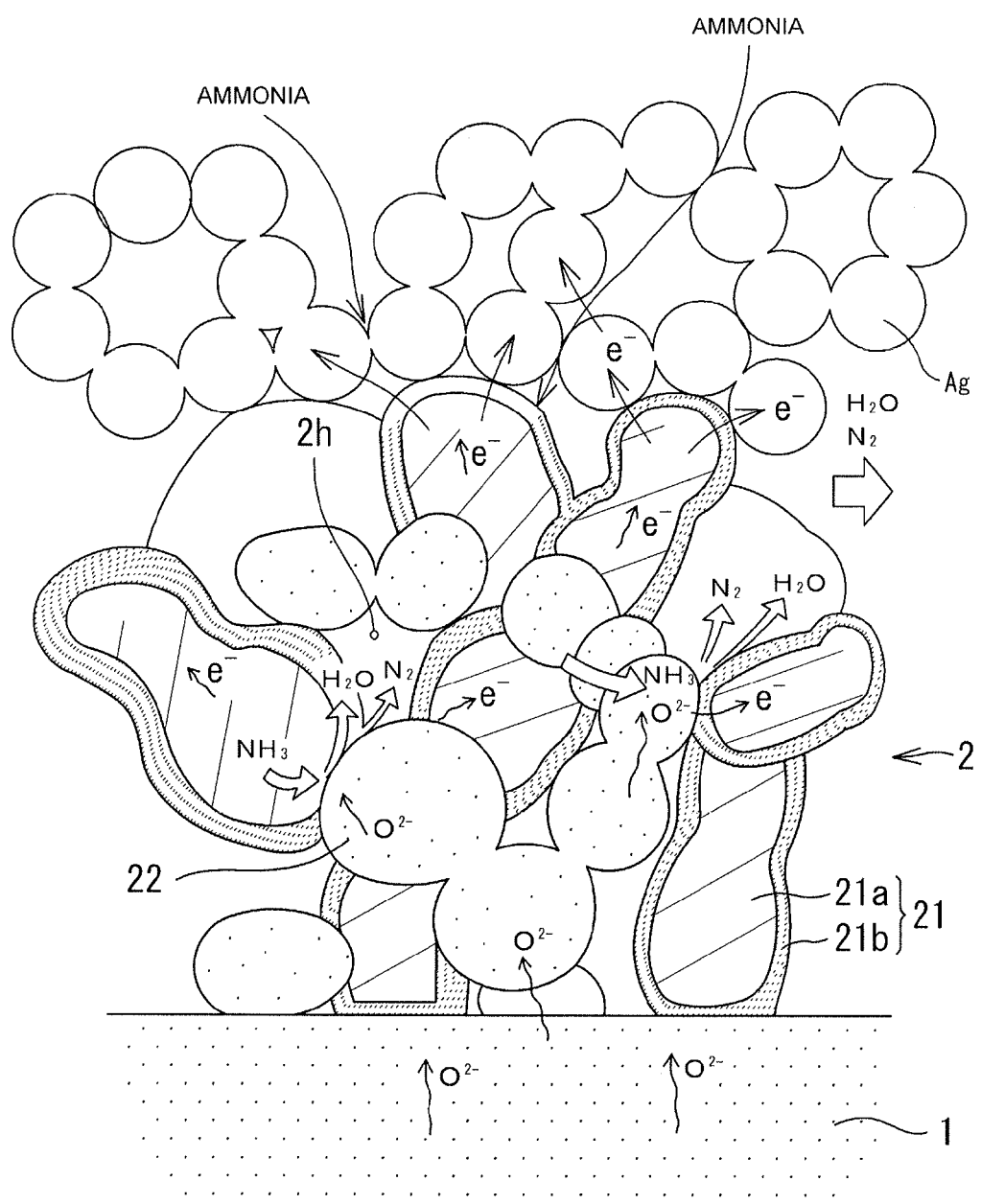
FIG. 9 is an explanatory view of an electrochemical reaction in an anode.

FIG. 9 is an explanatory view of the electrochemical reaction in the anode 2 in the case where the solid electrolyte 1 is oxygen-ion conductive. An ammonia-containing gaseous fluid is introduced into the anode 2 and flows through pores 2h. The anode 2 is a sinter mainly composed of metal chain particles 21 whose surfaces are oxidized to have oxide layers and an oxygen-ion conductive ceramic 22. Examples of the oxygen-ion conductive ceramic 22 include scandium stabilized zirconia (SSZ), yttrium stabilized zirconia (YSZ), samarium-doped ceria (SDC), lanthanum gallate (LSGM), and gadolia-doped ceria (GDC).

The metal of the metal chain particles 21 is preferably nickel (Ni) or iron (Fe)-containing Ni. More preferably, the metal contains Ti in a trace amount, about 2 to about 10000 ppm.

Ni itself has catalysis that promotes decomposition of ammonia. When Ni contains a trace amount of Fe or Ti, the catalysis can be further enhanced. When such Ni is oxidized to form nickel oxide, the promotion effect due to the metal can be further enhanced. Note that the decomposition reaction of ammonia (anode reaction) is a reduction reaction; in the product to be used, Ni chain particles have oxide layers formed by sintering or the like; as a result of use of the product, the metal chain particles in the anode are also reduced and the oxide layers are eliminated. However, Ni itself certainly has catalysis. In addition, to compensate for the lack of the oxide layers, Ni may contain Fe or Ti to compensate for the degradation of the catalysis.

In addition to the catalysis, in the anode, oxygen ions are used in the decomposition reaction. Specifically, the decomposition is performed in the electrochemical reaction. In the anode reaction $2NH_3+3O^{2-} \rightarrow N_2+3H_2O+6e^-$, oxygen ions contribute to a considerable increase in the decomposition rate of ammonia. In the anode reaction, free electrons $e^-$ are generated. When electrons $e^-$ remain in the anode 2, the occurrence of the anode reaction is inhibited. The metal chain particles 21 have the shape of an elongated string; a content 21a covered with an oxide layer 21b is composed of a metal (Ni) serving as a good conductor. Electrons $e^-$ smoothly flow in the longitudinal direction of the string-shaped metal chain particles. Accordingly, electrons $e^-$ do not remain in the anode 2 and pass through the contents 21a of the metal chain particles 21 to the outside. The metal chain particles 21 considerably facilitate passage of electrons e".

In summary, (1) promotion of decomposition reaction by nickel chain particles, Fe-containing nickel chains, or Fe- and Ti-containing nickel chain particles (high catalysis)
(2) promotion of decomposition by oxygen ions (promotion of decomposition in electrochemical reaction)
(3) establishment of conduction of electrons with string-shaped metal chain particles (high electron conductivity)

These (1), (2), and (3) considerably promote the anode reaction.

By simply increasing the temperature and contacting with a catalyst a gas to be decomposed, decomposition of this gas proceeds. In addition, as illustrated in FIGS. 7 and 8, in the present embodiment, the Ni mesh sheet 11a is disposed on the surface of the anode 2 with the porous silver-paste-coated layer 11g therebetween; accordingly, the electric resistance in the inner surface of the anode 2 is low and substantially uniform over the entire surface; as a result, the anode reaction can be efficiently caused over the entire region of the surface of the anode 2. In FIG. 8, the porous silver-paste-coated layer 11g includes a silver-paste portion 11y and a pore portion 11p. In the present embodiment, when the silver-paste-coated layer 11g having a thickness of 50 μm was disposed on the surface of the first electrode 2, the value of the resistance between the second-electrode collector 12 and the central conductive rod 11k was decreased from 0.26Ω to 0.20Ω. Furthermore, the silver-paste-coated layer 11g, which is porous, does not prevent ammonia from coming into contact with the anode 2.

In the above description, the case where the solid electrolyte 1 is oxygen-ion conductive is described. Alternatively, the solid electrolyte 1 may be proton ($H^+$)-conductive. In this case, the ion-conductive ceramic 22 in the anode 2 may be a proton-conductive ceramic, for example, barium zirconate.

—Mixing and Sintering—

When the oxygen-ion-conductive metal oxide (ceramic) in the anode 2 is SSZ, a SSZ raw-material powder has an average particle size of about 0.5 μm to about 50 μm. The mixing ratio (mol ratio) of the metal chain particles 21 whose surfaces are oxidized to SSZ 22 is in the range of 0.1 to 10. The mixture is sintered by, for example, being held in the air atmosphere at a temperature in the range of 1000° C. to 1600° C. for 30 to 180 minutes.

<Metal Chain Particles 21>

—Reduction Precipitation Process—

The metal chain particles 21 are preferably produced by a reduction precipitation process. This reduction precipitation process for the metal chain particles 21 is described in detail in, for example, Japanese Unexamined Patent Application Publication No. 2004-332047. The reduction precipitation process described herein employs trivalent titanium (Ti) ions as a reducing agent and precipitated metal particles (such as Ni particles) contain a trace amount of Ti. Accordingly, quantitative analysis in terms of Ti content allows identification that the particles are produced by a reduction precipitation process employing trivalent titanium ions. By changing the type of metal ions coexistent with the trivalent titanium ions, desired metal particles can be obtained; to obtain Ni particles, Ni ions are used together with the trivalent titanium ions; addition of a trace amount of Fe ions results in the formation of Ni chain particles containing a trace amount of Fe.

To form chain particles, the metal needs to be a ferromagnetic metal and also satisfy a predetermined size or more. Since Ni and Fe are ferromagnetic metals, metal chain particles can be easily formed. The requirement in terms of size needs to be satisfied during the process in which a ferromagnetic metal forms magnetic domains to cause bonding together through magnetic force and, in this bonding state, metal precipitation and subsequent growth of a metal layer are achieved to cause integration as a metal body. Even after metal particles having a predetermined size or more are bonded together through magnetic force, the metal precipitation continues: for example, neck portions at the boundaries between bonded metal particles grow thicker together with the other portions of the metal particles.

The metal chain particles 21 contained in the anode 2 preferably have an average diameter D of 5 nm or more and 500 nm or less, and an average length L of 0.5 μm or more and 1000 μm or less. The ratio of the average length L to the average diameter D is preferably 3 or more. Note that the metal chain particles 21 may have dimensions that do not satisfy these ranges.

—Formation of Oxide Layer—

The importance of the surface oxidation treatment slightly diminishes for the anode 2 because reduction is to be caused.

Hereinafter, such surface oxidation processes will be described. Three processes are preferred: (i) thermal oxidation by vapor-phase process, (ii) electrolytic oxidation, and (iii) chemical oxidation. In (i), a treatment is preferably performed in the air at 500° C. to 700° C. for 1 to 30 minutes; this is the simplest process; however, control of the thickness of the oxide film is less likely to be achieved. In (ii), the surface oxidation is achieved by anodic oxidation through application of an electric potential of about 3 V with respect to a standard hydrogen electrode; this process has a feature that the thickness of the oxide film can be controlled by changing the amount of electricity in accordance with a surface area; however, for a large area, a uniform oxide film is less likely to be formed. In (iii), the surface oxidation is achieved by immersion for about 1 to about 5 minutes in a solution in which an oxidizing agent such as nitric acid is dissolved; the thickness of the oxide film can be controlled by changing time, temperature, or the type of the oxidizing agent; however, washing the agent off is cumbersome. Although all these processes are preferred, (i) and (iii) are more preferred.

The oxide layer desirably has a thickness in the range of 1 nm to 100 nm, more preferably 10 nm to 50 nm. Note that the thickness may be out of such ranges. When the thickness of the oxide film is excessively small, catalysis is not sufficiently provided; in addition, metalization may be caused even in a slightly reducing atmosphere. On the other hand, when the thickness of the oxide film is excessively large, catalysis is sufficiently maintained; however, electron conductivity is degraded at the interface, resulting in degradation of electric power generation performance.

<Cathode>

—Configuration and Effect—

Figure 10:
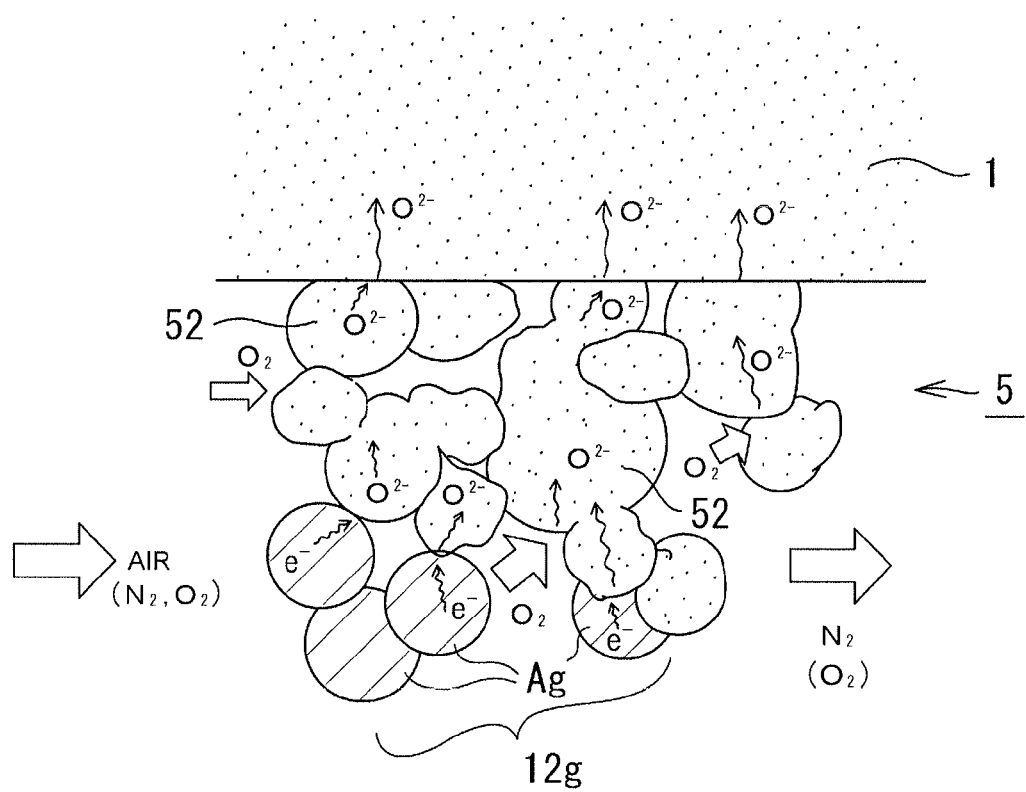
FIG. 10 is an explanatory view of an electrochemical reaction in a cathode.

FIG. 10 is an explanatory view of the electrochemical reaction in the cathode 5 in the case where the solid electrolyte 1 is oxygen-ion conductive. In the cathode 5, the air, in particular, oxygen molecules are introduced. The cathode 5 is a sinter mainly composed of an oxygen-ion-conductive ceramic 52.

In this case, preferred examples of the oxygen-ion-conductive ceramic 52 include lanthanum strontium manganite (LSM), lanthanum strontium cobaltite (LSC), and samarium strontium cobaltite (SSC).

In the cathode 5 according to the present embodiment, Ag particles are disposed in the form of the silver-paste-coated wiring 12g. In this form, the Ag particles exhibit catalysis that considerably promotes the cathode reaction: $O_2+4e^-\rightarrow 2O_{2-}$. As a result, the cathode reaction can proceed at a very high rate. The Ag particles preferably have an average size of 10 nm to 100 nm.

In the above description, the case where the solid electrolyte 1 is oxygen-ion conductive is described. Alternatively, the solid electrolyte 1 may be proton ($H^+$)-conductive. In this case, the ion-conductive ceramic 52 in the cathode 5 may be a proton-conductive ceramic, preferably barium zirconate or the like.

—Sintering—

SSZ having an average size of about 0.5 µm to about 50 µm is preferably used. Sintering conditions are holding in the air atmosphere at a temperature in the range of 1000° C. to 1600° C. for about 30 to about 180 minutes.

<Solid Electrolyte>

Although the electrolyte 1 may be a solid oxide, molten carbonate, phosphoric acid, a solid polymer, or the like, the solid oxide is preferred because it can be used in a small size and easily handled. Preferred examples of the solid oxide 1 include oxygen-ion-conductive oxides such as SSZ, YSZ, SDC, LSGM, and GDC. Alternatively, as described above, proton-conductive barium zirconate may be used.

<Porous Metal Body>

The porous metal body 11s, which is an important component of the collector for the anode 2 is preferably a metal-plated body. The metal-plated porous body is preferably a Ni-plated porous body such as Celmet (registered trademark) described above. The Ni-plated porous body can be formed so as to have a high porosity of, for example, 0.6 or more and 0.98 or less; thus, it can function as a component of the collector for the anode 2 serving as an inner-surface-side electrode and can also have very high gas permeability. When the porosity is less than 0.6, the pressure loss becomes high; when forced circulation employing a pump or the like is performed, the energy efficiency decreases and, for example, bending deformation is caused in ion-conductive members and the like, which is not preferable. To reduce the pressure loss and to suppress damage to ion-conductive members, the porosity is preferably 0.8 or more, more preferably 0.9 or more. On the other hand, when the porosity is more than 0.98, the electric conductivity becomes low and the current-collecting capability is degraded.

<Method for Producing Gas Decomposition Component According to an Embodiment of the Present Invention>

Figure 11:
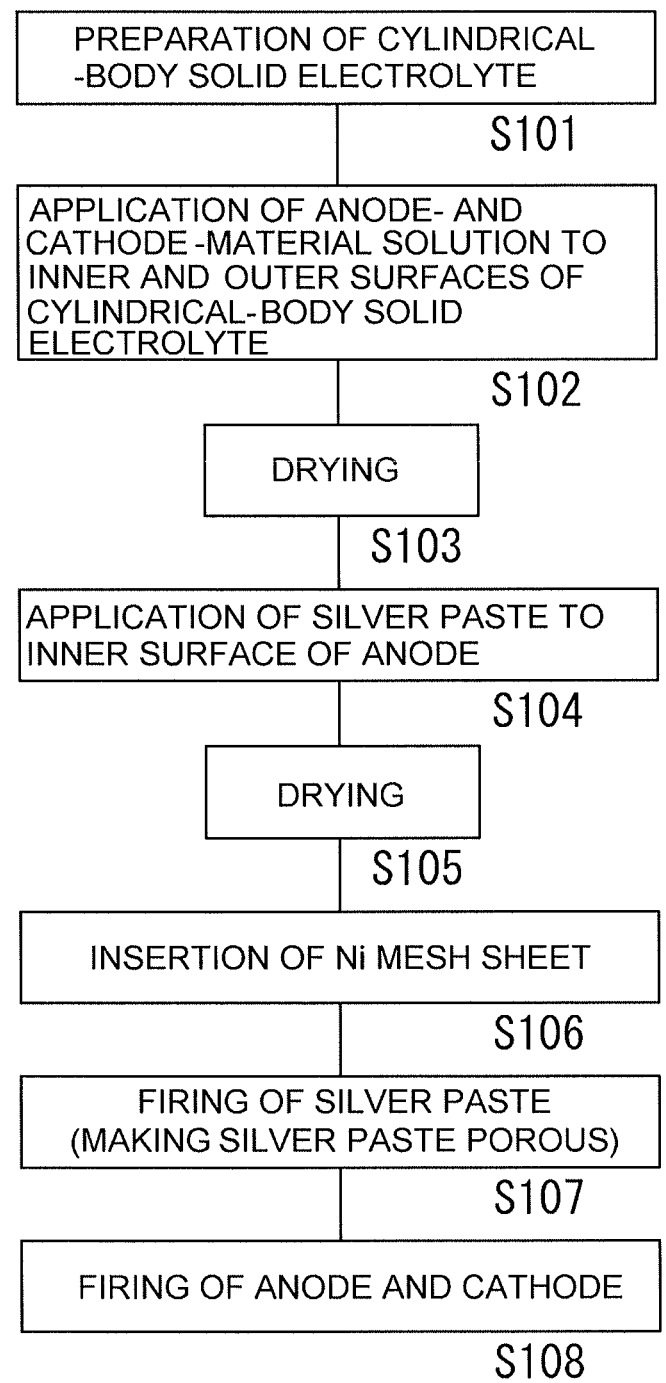
FIG. 11 is a flow chart illustrating main steps in a method for producing a gas decomposition component according to the present invention.

Referring to FIG. 11, an overview of a method for producing a gas decomposition component will be described. FIG. 11 illustrates steps in which the anode 2 and the cathode 5 are simultaneously fired. A cylindrical solid electrolyte 1 that is commercially available is first bought and prepared (S101). Subsequently, a solution is prepared by dissolving a material for forming the anode 2 and the cathode 5 in a solvent, and the solution is sequentially applied to the inner surface and outer surface of the cylindrical body (S102). After that, the cylindrical body having the anode 2 and the cathode 5 thereon is dried (S103).

In the present embodiment, a silver paste is then applied to the inner surface of the anode 2 to a predetermined thickness (S104). The process for applying the silver paste is not particularly limited. For example, the cylindrical body may be immersed in a silver-paste solution to form the silver-paste-coated layer 11g. The silver-paste-coated layer 11g is then dried (S105).

After the silver-paste-coated layer 11g is dried, a Ni mesh sheet is inserted (S106). The silver-paste-coated layer 11g is then fired at a predetermined temperature so that the silver-paste-coated layer 11g is made porous (S107). The firing temperature is set to be the sublimation temperature of the sublimable binder contained in the silver paste. For example, when a naphthalene-based binder is employed, the silver-paste-coated layer 11g is held at about 400° C. for a predetermined time to be made porous. By removing the binder through sublimation, shrinkage at the time when the silver-paste-coated layer 11g becomes porous is suppressed and the Ni mesh sheet can be made to be in contact with the silver-paste-coated layer 11g with certainty. After or while the silver paste becomes porous, the silver particles are sintered. As a result, the porous silver-paste-coated layer 11g is formed. Note that a conductive-rod insertion step may be performed between (S106) and (S107): in the conductive-rod insertion step, a central conductive rod around which a porous metal sheet is wound is inserted into the cylindrical-body MEA in which the metal mesh sheet has been disposed.

After the silver-paste-coated layer 11g is made porous, the material of the anode 2 and the cathode 5 is fired (S108). Making the silver-paste-coated layer 11g porous (S107) and firing the material of the anode 2 and the cathode 5 (S108) may be continuously performed.

Other than the production method illustrated in FIG. 11, there are a large number of variations. For example, the anode 2 and the cathode 5 may be separately fired. In addition, there are a large number of variations. The production conditions can be determined in comprehensive consideration of, for example, materials forming the portions, a target decomposition efficiency, and production costs.

Regarding the gas decomposition component 10, a single gas decomposition component 10 may be used alone to constitute a gas decomposition apparatus; alternatively, a plurality of gas decomposition components 10 arranged in parallel may be used to constitute a gas decomposition apparatus that can treat a large amount of gas.

Second Embodiment

Figure 12:
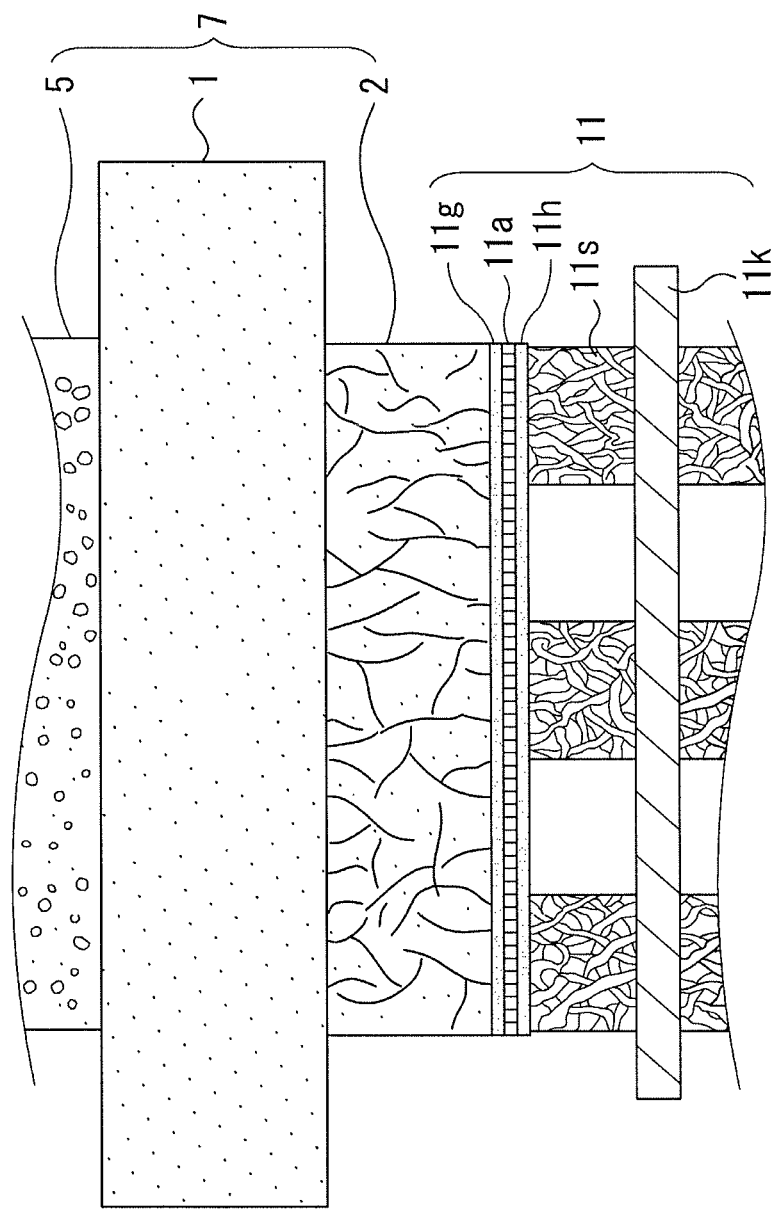
FIG. 12 is an enlarged longitudinal sectional view of a main portion of a gas decomposition component according to a second embodiment.

FIG. 12 is a longitudinal sectional view of a gas decomposition component 10 according to a second embodiment of the present invention. The present embodiment has a feature that an anode collector 11 has the following configuration: silver-paste-coated layer 11g being in contact with anode 2/Ni mesh sheet 11a/silver-paste-coated layer 11h/porous metal body 11s/central conductive rod 11k. That is, the silver-paste-coated layers 11g and 11h are disposed on both sides of the Ni mesh sheet 11a in the gas decomposition component 10 in FIGS. 1A and 1B.

As described above, even when Celmet (registered trademark), which is a metal-plated body, is used as the porous metal body 11s, it is difficult to control the contact pressure so as to be constant. Accordingly, the electric resistance between the Ni mesh sheet 11a and the porous metal body 11s may become high.

As illustrated in FIG. 12, by disposing the silver-paste-coated layers 11g and 11h on both sides of the Ni mesh sheet 11a, the resistance between these members can be made low. In addition, the contact state does not vary depending on temperature change or the like and the gas decomposition reaction can be maintained with stability.

(Another Gas Decomposition Component)

Table I describes examples of other gas decomposition reactions to which a gas decomposition component according to the present invention can be applied. A gas decomposition reaction R1 is an ammonia/oxygen decomposition reaction described in the first embodiment. In addition, a gas decomposition component according to the present invention can be applied to all the gas decomposition reactions R2 to R8: specifically, ammonia/water, ammonia/NOx, hydrogen/oxygen, ammonia/carbon dioxide, volatile organic compounds (VOC)/oxygen, VOC/NOx, water/NOx, and the like. In any of the reactions, the first electrode is not limited to an anode and may be a cathode. This cathode and the other electrode are made to constitute a pair.

TABLE I

| | Item | | | |
|---|---|---|---|---|
| Number | Gas introduced into anode | Moving ion | Gas introduced into cathode | Electrochemical reaction |
| R1 | $NH_3$ | $O^{2-}$ | $O_2$ | Power generation |
| R2 | $NH_3$ | $O^{2-}$ | $H_2O$ | Power generation |
| R3 | $NH_3$ | $O^{2-}$ | $NO_2$, NO | Power generation |
| R4 | $H_2$ | $O^{2-}$ | $O_2$ | Power generation |
| R5 | $NH_3$ | $O^{2-}$ | $CO_2$ | Electrolysis (supply of electric power) |
| R6 | VOC such as $CH_4$ | $O^{2-}$ | $O_2$ | Power generation |
| R7 | VOC such as $CH_4$ | $O^{2-}$ | $NO_2$, NO | Electrolysis (supply of electric power) |
| R8 | $H_2O$ | $O^{2-}$ | $NO_2$, NO | Electrolysis (supply of electric power) |

Table I merely describes several examples of a large number of electrochemical reactions. A gas decomposition component according to the present invention is also applicable to a large number of other reactions. For example, the reaction examples in Table I are limited to examples in which oxygen-ion-conductive solid electrolytes are employed. However, as described above, reaction examples in which proton ($H^+$)-conductive solid electrolytes are employed are also major embodiments of the present invention. Even when a proton-conductive solid electrolyte is employed, in the combinations of gases described in Table I, the gas molecules can be finally decomposed, though the ion species passing through the solid electrolyte is proton. For example, in the reaction (R1), in the case of a proton-conductive solid electrolyte, ammonia ($NH_3$) is decomposed in the anode into nitrogen molecules, protons, and electrons; the protons move through the solid electrolyte to the cathode; the electrons move through the external circuit to the cathode; and, in the cathode, oxygen molecules, the electrons, and the protons generate water molecules. In view of the respect that ammonia is finally combined with oxygen molecules and decomposed, this case is the same as the case where an oxygen-ion conductive solid electrolyte is employed.

(Other Application Examples)

The above-described electrochemical reactions are gas decomposition reactions intended for gas detoxification. There are also gas decomposition components whose main purpose is not gas detoxification. A gas decomposition component according to the present invention is also applicable to such electrochemical reaction apparatuses, such as fuel cells.

Embodiments of the present invention have been described so far. However, embodiments of the present invention disclosed above are given by way of illustration, and the scope of the present invention is not limited to these embodiments. The scope of the present invention is indicated by Claims and embraces all the modifications within the meaning and range of equivalency of the Claims.

INDUSTRIAL APPLICABILITY

A gas decomposition component according to the present invention can provide a small apparatus in which an electrochemical reaction is used to reduce the running cost and high treatment performance can be achieved.

REFERENCE SIGNS LIST 2 anode (first electrode)
5 cathode (second electrode)
1 solid electrolyte
7 cylindrical-body MEA
10 gas decomposition component
11s porous metal body
11g silver-paste-coated layer (conductive-paste-coated layer)
11a Ni mesh sheet (metal mesh sheet)

The invention claimed is:

1. A power generation apparatus including a gas decomposition component, the gas decomposition component comprising:
   a cylindrical-body membrane electrode assembly (MEA) including a solid electrolyte, a first electrode disposed on an inner-surface side of the solid electrolyte, and a second electrode disposed on an outer-surface side of the solid electrolyte;
   a first porous conductive-paste-coated layer formed on an inner circumferential surface of the first electrode, wherein the first porous conductive-paste-coated layer has a thickness in the range of 5 μm or more and 300 μm or less and a porosity of the first porous conductive-paste-coated layer is in the range of 20% or more and 80% or less;
   a metal mesh sheet disposed on an inner circumferential side of the first conductive-paste-coated layer;
   a porous metal body inserted on the inner-surface side of the metal mesh sheet and electrically connected to the first electrode;
   an electrical connection between the first electrode and the porous metal body that is established through the first conductive-paste-coated layer and the metal mesh sheet, and
   a second porous conductive-paste-coated layer is formed between an outer circumferential surface of the porous metal body and an inner circumferential surface of the metal mesh sheet,
   wherein a first gaseous fluid is introduced into the first electrode, a second gaseous fluid is introduced into the second electrode, and electric power is output from the first electrode and the second electrode, and
   a power-supply part that supplies the electric power to another electric apparatus.

2. The power generation apparatus according to claim 1, wherein the metal mesh sheet is formed so as to have a cylindrical shape and is disposed so as to cover an entire surface of the first electrode.

3. The power generation apparatus according to claim 1, wherein the porous conductive-paste-coated layer is formed from a paste containing silver particles.

4. The power generation apparatus component according to claim 1, wherein the porous conductive-paste-coated layer is formed on an entire surface of the first electrode.

5. The power generation apparatus according to claim 1, wherein the porous conductive-paste-coated layer is formed so as to have a band pattern or a grid pattern.

6. The power generation apparatus according to claim 1, wherein the first electrode and/or the second electrode is a sinter containing an ion-conductive ceramic and metal chain particles mainly containing nickel (Ni).

7. The power generation apparatus according to claim 1, wherein the solid electrolyte has oxygen-ion conductivity or proton conductivity.

8. The power generation apparatus according to claim 1, further comprising a heater, wherein the electric power is supplied to the heater.

9. The power generation apparatus according to claim 6, wherein the metal chain particles have an average diameter in the range of 5 nm or more and 500 nm or less.

10. The power generation apparatus according to claim 6, wherein the metal chain particles have an average length in the range of 0.5 μm or more and 1000 μm or less.

* * * * *